US00RE36049E

United States Patent [19]

Kamekura et al.

[11] E Patent Number: Re. 36,049

[45] Reissued Date of Patent: Jan. 19, 1999

[54] CEMENTED LENS AND PROCESS FOR PRODUCTION THEREOF

[75] Inventors: Yosio Kamekura; Masanao Kawahara, both of Tokyo, Japan

[73] Assignee: Asahi Kogaku Kogyo Kabushiki Kaisha, Tokyo, Japan

[21] Appl. No.: 339,185

[22] Filed: Nov. 10, 1994

Related U.S. Patent Documents

Reissue of:

[64] Patent No.: 5,162,825
Issued: Nov. 10, 1992
Appl. No.: 672,989
Filed: Mar. 21, 1991

[30] Foreign Application Priority Data

Mar. 30, 1990 [JP] Japan ..... 2-83387

[51] Int. Cl.[6] ..... G02C 7/10

[52] U.S. Cl. ..... 351/163; 351/159; 351/177

[58] Field of Search ..... 351/159, 163, 351/166, 164, 165, 177

[56] References Cited

U.S. PATENT DOCUMENTS

| | | | |
|---|---|---|---|
| 3,877,798 | 4/1975 | Tolar et al. | 351/168 |
| 4,043,637 | 8/1977 | Hovey | 359/241 |
| 4,274,717 | 6/1981 | Davenport | 351/177 |
| 4,295,948 | 10/1981 | Roman et al. | 428/442 |
| 4,547,049 | 10/1985 | Cotie | 351/172 |
| 4,645,317 | 2/1987 | Frieder et al. | 351/168 |
| 4,690,512 | 9/1987 | Forsyth | 359/796 |
| 4,740,070 | 4/1988 | Vance | 351/163 |
| 4,781,452 | 11/1988 | Ace | 351/177 |
| 4,867,553 | 9/1989 | Frieder | 351/172 |
| 4,883,548 | 11/1989 | Onoki | 351/166 |
| 4,969,729 | 11/1990 | Merle | 351/168 |
| 5,018,223 | 5/1991 | Dawson et al. | 351/62 |
| 5,162,825 | 11/1992 | Kamekura et al. | 359/163 |
| 5,253,111 | 10/1993 | Chiba et al. | 351/166 |

FOREIGN PATENT DOCUMENTS

| | | |
|---|---|---|
| 0110221 | 6/1984 | European Pat. Off. . |
| 0190614 | 8/1986 | European Pat. Off. . |
| 0356204 | 2/1990 | European Pat. Off. . |
| 2236479 | 2/1975 | France . |
| 2281968 | 3/1976 | France . |
| 59-22923 | 5/1984 | Japan . |
| 63-91623 | 4/1988 | Japan . |
| 63-18326 | 10/1988 | Japan . |
| 121837 | 1/1919 | United Kingdom . |
| 257507 | 9/1926 | United Kingdom . |
| 279799 | 9/1927 | United Kingdom . |
| 304074 | 1/1929 | United Kingdom . |
| 356832 | 9/1931 | United Kingdom . |
| 423457 | 2/1935 | United Kingdom . |
| 433710 | 8/1935 | United Kingdom . |
| 2043946 | 10/1980 | United Kingdom . |
| 2204146 | 11/1988 | United Kingdom . |
| 2242541 | 10/1991 | United Kingdom . |
| 87-02477 | 4/1987 | WIPO . |
| 90-12338 | 10/1990 | WIPO . |

OTHER PUBLICATIONS

Database, WPI, Derwent Publications, Ltd., London, GB AN 91-344309.

English Lanugage Abstract of Japanese Application of 56062202.

*Primary Examiner*—Scott J. Sugarman
*Attorney, Agent, or Firm*—Greenblum & Bernstein, P.L.C.

[57] ABSTRACT

A cemented lens consists of a lens that is tinted and/or contains a UV absorber, and a second lens that is neither tinted nor contains any UV absorber. The cemented lens is formed by placing the two lens elements together with a UV-curable adhesive between them, and then directing UV radiation through the first lens to cure the adhesive.

25 Claims, 1 Drawing Sheet

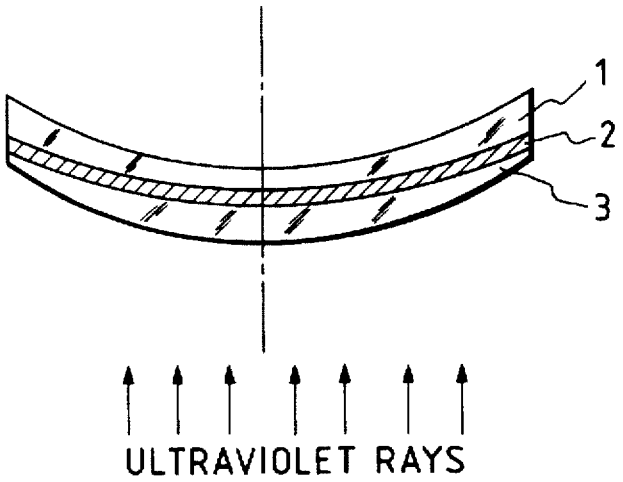
1
2
3
ULTRAVIOLET RAYS

CEMENTED LENS AND PROCESS FOR PRODUCTION THEREOF

Matter enclosed in heavy brackets [ ] appears in the original patent but forms no part of this reissue specification; matter printed in italics indicates the additions made by reissue.

This application is based on and claims priority from Japanese Application No. Hei. 2-83387 filed Mar. 30, 1990, the disclosure of which is incorporated by reference herein.

BACKGROUND OF THE INVENTION

In order to insure that multi-focal lenses and progressive power lenses that are capable of correcting astigmatism are manufactured in a rapid way in accordance with the directions that are specifically formulated for users by ophthalmologists or opticians, lens elements of various specifications are preliminarily prepared and, as soon as orders are received, they are combined in an appropriate way without grinding or polishing and bonded together to produce cemented lenses. This is a well known practice which may be implemented, e.g., by preliminarily preparing a front lens element (which is to be positioned on the object side) that provides power for the final lens and a rear lens element (which is to be positioned on the eye side) that provides the degree of astigmatism in diopters and the axis of astigmatism, and bonding these together to form a cemented lens according to specific directions. Before cementing, the individual lens elements are usually provided with a hard coating layer either on the side to become an outer surface or on both sides, and after optional tinting an anti-reflection film is formed to produce a complete cemented lens.

Plastic materials of which cemented lenses are made incorporate additives such as UV absorbers and antioxidants in order to improve the lightfastness of the lenses. Therefore, if UV-curable adhesives are used to cement lens elements together, UV radiation will not easily reach the area where the adhesive has been applied, and the adhesive will not be fully cured unless the dose of UV radiation is considerably increased. However, an excessive dose of UV radiation can cause adverse effects on the plastic lens material. On the other hand, if thermosetting adhesives are used to cement lens elements, they must be cured at comparatively low temperatures in order to insure that defects such as yellowing will not occur in the plastic lens material, but this has resulted in unduly prolonged cure times.

SUMMARY OF THE INVENTION

It is therefore an object of the present invention to provide a process by which a cemented lens can be produced using a UV-curable adhesive in a rapid way with the required dose of UV radiation being comparable to ordinarily levels.

It is another object of the present invention to provide a cemented lens that is produced by this method.

The cemented lens of the present invention consists of a first lens element that contains a UV absorber and a second lens element that does not contain a UV absorber. This cemented lens can be produced by a process comprising the steps of applying a UV-curable adhesive onto the mating surfaces of the first and second lenses, assembling the two lens elements and applying UV radiation to the assembly from the side of the second lens element not containing a UV absorber.

BRIEF DESCRIPTION OF THE DRAWINGS

The present invention will be more clearly understood from the following description with reference to the accompanying drawings, wherein the single Figure shows a cross section of a cemented lens according to an embodiment of the present invention.

DETAILED DESCRIPTION OF THE INVENTION

As described above, the cemented lens according to the present invention consists of a first lens element that contains a UV absorber and a second lens element that does not contain a UV absorber, and can be produced by applying a UV-curable adhesive onto the mating surfaces of the first and second lens elements, assembling the two lens elements and applying UV radiation to the assembly from the side of the second lens element not containing a UV absorber.

The lens elements to be used in the present invention are made of plastic materials including a diethylene glycol bisallyl carbonate polymer, a polyurethane resin, an acrylic resin, a polycarbonate resin and styrene resin.

The UV absorbers that can be used in the present invention are not limited in any particular way and may be selected among various known types including benzophenone, salicylate, benzotriazole and cyanoacrylate compounds. The UV absorbers are preferably used in amounts of 0.1–2 wt % of the resin.

Various colorless UV-curable adhesives may be used and examples are acrylic adhesives including N-vinylpyrrolidone, 2-ethylhexyl acrylate, 2-hydroxyethyl acrylate, 2-hydroxypropyl acrylate, phenoxyethyl acrylate, tetrahydrofurfuryl acrylate, isobornyl acrylate and N,N-diethylaminoethyl acrylate.

As mentioned above, the cemented lens of the present invention consists of two lens elements, one containing a UV absorber and the other containing no UV absorber. The lens element that does not contain a UV absorber may be the front or rear lens. However, considering the fact that the mating surface of the front lens element which provides power for the final cemented lens is concave, the lens element that does not contain a UV absorber is preferably used as the front lens if UV radiation is to be applied from beneath the front lens since the adhesive can be cured without sagging. If this approach is taken, UV radiation applied from beneath the front lens that does not contain a UV absorber reaches the adhesive layer to cure it. Since the rear lens contains a UV absorber, the lightfastness of the cemented lens or the user's eye will not be adversely affected even if the front lens does not contain a UV absorber. If UV radiation is to be applied from above the rear lens, the lens element that does not contain a UV absorber is preferably used as the rear lens.

Further, a tinted lens element permits transmission of UV radiation in varying amounts depending on the density of tinting, and a smaller amount of UV radiation will be transmitted as the density increases. Hence, if a tinted, cemented lens is to be produced according to the present invention, the lens element that contains a UV absorber is preferably tinted whereas the lens element to be illuminated with UV radiation is not tinted.

The accompanying Figure shows a cross section of a cemented lens according to an embodiment of the present invention. As shown, a tinted rear lens 1 containing a UV absorber is bonded to a front lens 3 with a UV-curable adhesive 2. The front lens 3 neither contains a UV absorber nor is tinted. To produce the cemented lens shown in the drawing, UV radiation is applied from beneath the front lens 3 that does not contain either a UV absorber or a tinting dye, so that the applied UV radiation passes unimpeded through the front lens 3 and reaches the UV-curable adhesive 2 to cure it rapidly.

EXAMPLES OF THE INVENTION

The following examples are provided for the purpose of further illustrating the present invention, but are in no way to be taken as limiting.

The performance of the cemented lenses produced in the examples and comparative examples was tested, and the results are set forth in the Table below, where the comparative examples are designated by a "CE" prefix. The following is an explanation of the testing methods used and the results shown in the Table.

Precision

The (*e.g., corrective*) power and diopters of the cemented lens products was measured with a refractometer, and their appearance was inspected visually, with a o in the Table indicating that nothing abnormal occured in the measurement or the lens appearance as compared to the desired precision, and an X indicating that something abnormal was found.

Adhesion Under Humid Conditions

The products were left to stand in a humidifier at 50° C. for 24 hours, with a o in the Table indicating that no separation occurred in the bonded area, and an X indicating that separation occurred.

Adhesion In Hot Water

The products were immersed in hot water at 60° C. for 2 hours, with a o in the Table indicating that no separation occurred in the bonded area, and an X indicating that separation occurred.

Adhesion Upon Impact

The products were dropped from a height of 150 cm, with a o in the Table indicating that no separation occurred in the bonded area, and an X indicating that separation occurred.

EXAMPLE 1

Two thin lens elements were made from a diethylene glycol bisallyl carbonate resin, and one of them which did not contain a UV absorber was used as the front lens. 0.3 grams of a UV-curable adhesive (2-hydroxyethyl acrylate) was dropped on the concave surface of this front lens. The other lens element had a benzophenone compound incorporated as a UV absorber in an amount of 0.2 wt%, and this rear lens was bonded to the front lens with UV radiation (10 mW/cm$^2$) being applied from the side of the front lens for 6 minutes. After bonding the two lens elements in this manner, the performance of the cemented lens was evaluated. As can be seen from the Table, there was nothing abnormal in precision or in the adhesion between the mating surfaces.

EXAMPLE 2

Two thin lens elements were made from a diethylene glycol bisallyl carbonate resin, and one of them which did not contain a UV absorber was used as the front lens. 0.3 grams of a UV-curable adhesive (2-hydroxyethyl acrylate) was dropped on the concave surface of this front lens. The other lens element had a benzophenone compound incorporated as a UV absorber in an amount of 0.2 wt %, and it was also tinted. This rear lens was bonded to the front lens with UV radiation (10 mW/cm$^2$) being applied from the side of the front lens for 6 minutes. After bonding the two lens elements in this manner, the performance of the cemented lens was evaluated. As can be seen from the Table, there was nothing abnormal in precision or in the adhesion between the mating surfaces.

EXAMPLE 3

Two thin lens elements were made from a diethylene glycol bisallyl carbonate resin, and one of them which did not contain a UV absorber was used as the front lens. 0.3 grams of a UV-curable adhesive (2-isobornyl acrylate) was dropped on the concave surface of this front lens. The other lens element had a benzophenone compound incorporated as a UV absorber in an amount of 0.2 wt %, and this rear lens was bonded to the front lens with UV radiation (10 mW/cm$^2$) being applied from the side of the front lens for 6 minutes. After bonding the two lens elements in this manner, the performance of the cemented lens was evaluated. As can be seen from the Table, there was nothing abnormal in precision or in the adhesion between the mating surfaces.

EXAMPLE 4

A thin front lens was made from a diethylene glycol bisallyl carbonate resin containing no UV absorber. 0.3 grams of a UV-curable adhesive (isobornyl acrylate) was dropped on the concave surface of this front lens. Thereafter, each of rear lenses that were made from polyurethane, styrene, polycarbonate and polymethyl methacrylate resins, respectively, and which contained 0.2 wt % of a benzophenone compound as a UV absorber was bonded to the front lens with UV radiation (10 mW/cm$^2$) being applied from the side of the front lens for 6 minutes. After bonding the two lens elements in this manner, the performance of the cemented lens was evaluated. As can be seen from the Table, there was nothing abnormal in precision or in the adhesion between the mating surfaces.

EXAMPLE 5

Two thin lens elements were made from a diethylene glycol bisallyl carbonate, and one of them which contained 0.2 wt % of a benzophenone compound as a UV absorber was used as the front lens. 0.3 grams of a UV-curable adhesive (2-hydroxyethyl acrylate) was dropped on the concave surface of this front lens. The other lens element which did not contain a UV absorber was used as the rear lens and was bonded to the front lens with UV radiation (10 mW/cm$^2$) being applied from the side of the rear lens for 6 minutes. After bonding the two lens elements in this manner, the performance of the cemented lens was evaluated. As can be seen from the Table, there was nothing abnormal in precision or in the adhesion between the mating surfaces.

COMPARATIVE EXAMPLE 1

Two thin lens elements were made from a diethylene glycol bisallyl carbonate resin containing 0.2 wt % of a benzophenone compound as a UV absorber. They were respectively used as the front and rear lenses. 0.3 grams of a UV-curable adhesive (2-hydroxyethyl acrylate) was dropped on the concave surface of the front lens, and the rear lens was bonded to it with UV radiation (10 mW/cm$^2$) being applied from the side of the front lens for 6 minutes. After bonding the two lens elements in this manner, the performance of the cemented lens was evaluated. As can be seen from the Table, there was nothing abnormal in precision but separation occurred between the mating surfaces in the adhesion tests in a humid condition, in hot water and under impact.

COMPARATIVE EXAMPLE 2

Two thin lens elements were made from a diethylene glycol bisallyl carbonate resin containing 0.2 wt % of a benzophenone compound as a UV absorber. They were respectively used as the front and rear lenses. 0.3 grams of a UV-curable adhesive (2-hydroxyethyl acrylate) was dropped on the concave surface of the front lens, and the rear lens was bonded to it with UV radiation (10 mW/cm$^2$) being applied from the side of the front lens for 50 minutes. After bonding the two lens elements in this manner, the performance of the cemented lens was evaluated. As can be seen from the Table, there was nothing abnormal in the adhesion tests but extensive yellowing was detected in the mating surfaces in the precision test.

COMPARATIVE EXAMPLE 3

Two thin lens elements were made from a diethylene glycol bisallyl carbonate resin. One of them which did not contain a UV absorber but which was tinted was used as the front lens, and 0.3 grams of a UV-curable adhesive (2-hydroxyethyl acrylate) was dropped on the concave surface of this front lens. The other lens element which had a benzophenone compound incorporated as a UV absorber in an amount of 0.2 wt % was bonded to the front lens with UV radiation (10 mW/cm$^2$) being applied from the side of the front lens for 6 minutes. After bonding the two lens elements in this manner, the performance of the cemented lens was evaluated. As can be seen from the Table, there was nothing abnormal in precision but separation occurred between the mating surfaces in the adhesion tests in a humid condition, in hot water and under impact.

COMPARATIVE EXAMPLE 4

Two thin lens elements were made from a diethylene glycol bisallyl carbonate resin. One of them which did not contain a UV absorber but which was tinted was used as the front lens, and 0.3 grams of a UV-curable adhesive (2-hydroxyethyl acrylate) was dropped on the concave surface of this front lens. The other lens element, which had a benzophenone compound incorporated as a UV absorber in an amount of 0.2 wt %, was bonded to the front lens with UV radiation (10 mW/cm$^2$) being applied from the side of the front lens for 50 minutes. After bonding the two lens elements in this manner, the performance of the cemented lens was evaluated. As can be seen from the Table, there was nothing abnormal in adhesion tests but extension color change was detected in the tinted surface in the precision test.

TABLE

| Example | Precision | Adhesion in Humid Condition | Adhesion in Hot Water | Adhesion Under Impact |
|---|---|---|---|---|
| 1 | o | o | o | o |
| 2 | o | o | o | o |
| 3 | o | c | o | o |
| 4 | o | o | o | o |
| 5 | o | o | o | o |
| CE 1 | o | X | X | X |
| CE 2 | X | o | o | o |
| CE 3 | o | X | X | X |
| CE 4 | X | o | o | o |

Note:
The Example 4 includes four types each having a rear lens made of polyurethane, styrene, polycarbonate and polymethyl methacrylate.

According to the present invention, a UV-curable adhesive applied to the mating surfaces of the two lens elements can be cured rapidly with UV radiation being applied in a dose comparable to ordinary levels. Hence, the present invention permits cemented lenses to be manufactured without much time lag from the receipt of orders. Further, the resulting cemented lens contains a UV absorber in one of the two lens elements, so it can be used on the eye without causing any trouble. As a further advantage, the lens has satisfactory lightfastness.

It will be appreciated that various changes and modifications may be made to the invention without departing from the spirit and scope of the invention as defined in the following claims.

What is claimed is:

1. A cemented lens, consisting of a first lens element that contains a UV absorber and a second lens element that does not contain a UV absorber.

2. A cemented lens according to claim 1, wherein said second lens element is positioned away from the eye.

3. The cemented lens of claim 1, wherein said first and second lens elements are bonded together with a UV-curable adhesive, which is cured with UV radiation projected through said second lens element which does not contain a UV absorber.

4. The cemented lens of claim 3, wherein said first lens element is tinted and said second lens element is not tinted.

5. A cemented lens according to claim 4, wherein said untinted lens element is positioned away from the eye.

6. A process for producing a cemented lens, comprising the steps of applying a UV-curable adhesive onto mating surfaces of a first lens element containing a UV absorber and a second lens element not containing a UV absorber, assembling the two lens elements and applying UV radiation to the assembly through the second lens element.

7. A process according to claim 6, wherein said second lens element is positioned away from the eye.

8. A process according to claim 6, wherein the untinted lens element is positioned away from the eye.

9. A process for producing a cemented lens, comprising the steps of applying a UV-curable adhesive onto mating surfaces of a tinted lens element, which contains a UV absorber and an untinted lens element, which does not contain a UV absorber, assembling the two lens elements and applying UV radiation to the assembly through the untinted lens element.

*10. A cemented lens according to claim 1, wherein said first lens element comprises polycarbonate resin or polyurethane resin.*

*11. A cemented lens according to claim 1, wherein said second lens element comprises diethyleneglycol bisallylcarbonate polymer.*

*12. A cemented lens according to claim 1, wherein a surface of said second lens element is a multi-focus surface, a progressive multi-focus surface, or an aspheric surface.*

*13. A cemented lens according to claim 1, wherein said first lens element has a negative power.*

*14. A cemented lens according to claim 13, wherein said second lens element comprises diethyleneglycol bisallylcarbonate polymer.*

*15. A cemented lens according to claim 1, wherein said second lens element has a positive power.*

*16. A cemented lens according to claim 1, further comprising a light-setting adhesive which bonds said first and second lens elements.*

*17. A cemented lens according to claim 16, wherein said light-setting adhesive comprises a UV curable adhesive.*

*18. A cemented lens comprising:*

*a first lens located on a user's eye side of the cemented lens, said first lens comprising polycarbonate resin or polyurethane resin; and*

*a second lens located on an object side of the cemented lens, said front lens comprising a synthetic resin having a refractive index different from a refractive index of said rear lens, wherein only one of said first and second lenses contains a UV absorber.*

*19. A cemented lens according to claim 18, wherein said second lens comprises diethyleneglycol bisallylcarbonate polymer.*

*20. A cemented lens according to claim 18, wherein said first lens contains a UV absorber.*

*21. A cemented lens according to claim 18, wherein a surface of said second lens element is a multi-focus surface, a progressive multi-focus surface, or an aspheric surface.*

*22. A cemented lens according to claim 18, wherein said first lens has a negative power.*

*23. A cemented lens according to claim 18, wherein said second lens has a positive power.*

*24. A cemented lens according to claim 18, further comprising a light-setting adhesive which bonds said first and second lenses.*

*25. A cemented lens according to claim 18, wherein said light-setting adhesive comprises a UV curable adhesive.*

* * * * *